(12) United States Patent
Pines et al.

(10) Patent No.: US 8,982,409 B2
(45) Date of Patent: *Mar. 17, 2015

(54) METHOD, APPARATUS AND SYSTEM FOR PROVIDING REPRODUCIBLE DIGITAL IMAGERY PRODUCTS FROM FILM CONTENT

(75) Inventors: Joshua Pines, San Francisco, CA (US); Chris Kutcka, Pasadena, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1155 days.

This patent is subject to a terminal disclaimer.

(21) Appl. No.: 12/086,546

(22) PCT Filed: May 25, 2006

(86) PCT No.: PCT/US2006/020419
§ 371 (c)(1),
(2), (4) Date: Jun. 13, 2008

(87) PCT Pub. No.: WO2007/070087
PCT Pub. Date: Jun. 21, 2007

(65) Prior Publication Data
US 2009/0201367 A1 Aug. 13, 2009

Related U.S. Application Data

(60) Provisional application No. 60/751,021, filed on Dec. 16, 2005.

(51) Int. Cl.
*G06F 3/12* (2006.01)
*H04N 5/253* (2006.01)
(Continued)

(52) U.S. Cl.
CPC .................................... *H04N 5/253* (2013.01)
USPC ................. 358/1.9; 348/96; 348/104; 355/40

(58) Field of Classification Search
USPC ........... 348/97, E3.002, 104; 358/1.9; 355/40
See application file for complete search history.

(56) References Cited

U.S. PATENT DOCUMENTS 4,492,457 A * 1/1985 Kawada et al. .................. 355/38
5,003,379 A * 3/1991 Moore et al. ................... 348/104
(Continued)

FOREIGN PATENT DOCUMENTS

CN 1302045 7/2001
CN 1167036 9/2004
(Continued)

OTHER PUBLICATIONS

Kevin shaw_Digital Intermediates_ Selecting a Video or Data Workflow _Jan. 2005_ finalcolors, Inc.*
(Continued)

*Primary Examiner* — Aaron Strange
*Assistant Examiner* — Michael A Chambers
(74) *Attorney, Agent, or Firm* — Robert D. Shedd; Jorge Tony Villabon

(57) ABSTRACT

The present invention provides a method, apparatus and system for the transfer of motion picture film to reproducible digital imagery products such as digital dailies. In one embodiment of the present invention, a scanning device provides a log video signal representation of received film content, the log video signal including at least grey scale values of the colors of the received film content for enabling a quantitative assessment of the film content exposure information for providing repeatable and reproducible values from which a cinematographer/director of photography could order the color correction or adjustment of the film content in a reproducible manner understood by a color correction specialist or "timer".

20 Claims, 4 Drawing Sheets

(51) Int. Cl.
*H04N 9/11* (2006.01)
*G03B 27/52* (2006.01)

(56) References Cited

U.S. PATENT DOCUMENTS

| | | | |
|---|---|---|---|
| 5,121,159 A | 6/1992 | Ujiie | |
| 5,255,083 A * | 10/1993 | Capitant et al. | 358/527 |
| 5,387,929 A | 2/1995 | Collier | |
| 5,500,316 A | 3/1996 | Bogdanowicz et al. | |
| 5,574,659 A | 11/1996 | Delvers et al. | |
| 5,750,320 A * | 5/1998 | Bogdanowicz et al. | 430/383 |
| 6,115,062 A * | 9/2000 | Milson et al. | 348/96 |
| 6,271,908 B1 * | 8/2001 | Brett et al. | 355/40 |
| 6,304,730 B1 | 10/2001 | Fant et al. | |
| 6,750,901 B1 * | 6/2004 | Silverbrook | 348/207.2 |
| 6,845,178 B1 | 1/2005 | Evans et al. | |
| 6,849,366 B1 * | 2/2005 | Nirgudkar | 430/11 |
| 6,924,839 B2 | 8/2005 | Eiho et al. | |
| 7,133,070 B2 * | 11/2006 | Wheeler et al. | 348/223.1 |
| 2001/0022622 A1 * | 9/2001 | Eiho et al. | 348/252 |
| 2002/0130952 A1 | 9/2002 | Galt et al. | |
| 2002/0149679 A1 | 10/2002 | DeAngelis et al. | |
| 2002/0163657 A1 | 11/2002 | Bogdanowicz et al. | |
| 2003/0026494 A1 * | 2/2003 | Woodell et al. | 382/260 |
| 2003/0081117 A1 | 5/2003 | Bogdanowicz et al. | |
| 2003/0081118 A1 * | 5/2003 | Cirulli et al. | 348/104 |
| 2003/0081177 A1 * | 5/2003 | Rosen | 352/38 |
| 2003/0095197 A1 | 5/2003 | Wheeler et al. | |
| 2003/0112412 A1 | 6/2003 | Han et al. | |
| 2004/0109059 A1 | 6/2004 | Kawakita | |
| 2004/0150641 A1 | 8/2004 | Duiker | |
| 2005/0179775 A1 * | 8/2005 | Rodriguez et al. | 348/97 |
| 2005/0280842 A1 | 12/2005 | Rodriguez et al. | |
| 2006/0007460 A1 * | 1/2006 | Bogdanowicz et al. | 358/1.9 |
| 2009/0086100 A1 | 4/2009 | Pines et al. | |

FOREIGN PATENT DOCUMENTS

| | | |
|---|---|---|
| DE | 19714886 | 11/1997 |
| EP | 0987880 | 3/2000 |
| EP | 1103852 | 5/2001 |
| EP | 1237379 | 9/2002 |
| EP | 1239668 | 9/2002 |
| EP | 1307045 | 5/2003 |
| GB | 2304932 | 3/1997 |
| GB | 2307819 | 6/1997 |
| JP | 5260500 | 10/1993 |
| JP | 6217193 | 8/1994 |
| JP | 09247316 | 9/1997 |
| JP | 200151354 | 2/2001 |
| JP | 200178090 | 3/2001 |
| JP | 2001305870 | 11/2001 |
| JP | 2002135589 | 5/2002 |
| WO | WO9826583 | 6/1998 |
| WO | WO9960524 | 11/1999 |

OTHER PUBLICATIONS

Steve Shaw, Digital Dailies and DI, published Aug. 11, 2005 at website: http://www.cinematography.net/edited-pages/Digital_Dailies_and_DI.htm.*

Staes, K. et al.: "The Interface of Color Negative Film and Telecine," SMPTE Journal, vol. 92, No. 3, pp. 303-307, Mar. 1983.

Powell, S.J. et al.: "Interface of Motion-Picture Films and Video," SMPTE Journal, Vo. 95, No. 6, pp. 614-623, Jun. 1986, A01.

Powell, S.J. et al: "Eastman color high-speed negative film 7292," SMPTE Journal, vol. 95, No. 9, pp. 870-873, Sep. 1986, A01.

Search Report Dated Nov. 7, 2006.

Lee: "Digitally Controlled Equalizer", Konsumelektronik, Equalizer Conceopts, pp. 1-3. Nov. 11, 2007.

Shaw: "Diigital Intermediates: Selecting a Video or Data Workflow", finalcolor, inc. Published in Cinema Report, 2004, pp. 1-5, www.finalcolor.com.

Shaw: "Digital Dailies and DI". Published Aug. 11, 20065, pp. 1-3, Digital Praxis, Ltd. www.digitalpraxis.net.

* cited by examiner

METHOD, APPARATUS AND SYSTEM FOR PROVIDING REPRODUCIBLE DIGITAL IMAGERY PRODUCTS FROM FILM CONTENT

CROSS-REFERENCE TO RELATED APPLICATIONS

This application claims the benefit, under 35 U.S.C. §365 of International Application PCT/US2006/020419, filed May 25, 2006, which was published in accordance with PCT Article 21(2) on Jun. 21, 2007 in English and which claims the benefit of U.S. provisional patent application No. 60/751,021, filed Dec. 16, 2005.

FIELD OF THE INVENTION

The present invention generally relates to film imagery and, more particularly, to a method, apparatus and system for the transfer of motion picture film to reproducible digital imagery and for the color correction of the reproducible digital imagery products.

BACKGROUND OF THE INVENTION

In the motion picture industry an original motion picture negative film is exposed during a camera exposure operation, developed into a processed camera negative and subsequently operated upon in one of several ways to produce an imagery product. In prior art analog systems, film dailies or rushes were conventionally produced as a motion picture was shot. These dailies or rushes were processed and then viewed by the director, the producer, the film editor, etc. working on the production to determine whether the scenes shot were acceptable. Each person on the production team assessed the dailies for different elements relevant to their respective roles in the team. That is, dailies or rushes were printed on film. The cinematographers and directors could see the results of the previous day's work in a format that faithfully "previewed" what the final release would look like. A language developed between cinematographers and the "timer" at a lab where a director of photography (dp) could either literally dictate the color exposure intervals (e.g., lites), and hence the look of the dailies. Alternatively, assuming a relationship of trust which existed between the dp and the timer, the timer would choose the lites based on discussions with the dp, and the dp could verify, based on these lites, that the exposure was correct and that enough latitude was present on the negative for future color correction during the answer print process.

More specifically, with the dailies, "Printer Lite" information was provided which assisted the cinematographer/director of photography to determine whether the scenes were shot with a satisfactory exposure. This Printer Light information was determined from the settings of a conventional motion picture film printer required to produce a print with densities aimed at a specific laboratory. This information was obtained by passing white light from a scene through dichroic filters to split the light into its three components, red, green and blue, The three light components were used to expose a test film strip from which the densities corresponding to the intensities of the red, green and blue components of the light could be measured and compared with standard densities which correspond to an "ideal" exposure. The densities produced by the red, green and blue light components on the test film strip gave an indication of the exposure given to the original film as the scene was recorded. The "Printer Light" information provided repeatable and reproducible values from which a cinematographer/director of photography could order the color correction of the film in a manner understood by a color correction specialist (colorist) or "timer".

Today, however, there is an increasing demand for motion picture negative film to be transferred to video, and the film is never printed as such, as most film programs made specifically for television, for example, episodic shows, movies of the week and commercials, are transferred to video tape prior to showing. Telecine machines enable this transfer to be achieved. That is, color negative film information (from a camera negative) or the color print film information (from an interpositive) is transferred into a video signal using a telecine transfer device in a telecine scanning process. As with the optical process, the interpositive is a negative copying material that is used to produce a positive copy with the same contrast as the original negative and the same extended range of the scene. This element is then used in the trade as the element to scan on the telecine transfer device without risking harm to the original negative.

Telecine devices scan each negative or positive film frame transforming the transmittance at each pixel of an image into an electrical signal (e.g., a voltage). The signal processing then inverts the electrical signal in the case of a transfer made from a negative film in order to render a positive image, making a positive photographic print and then transferring the print film information into a video signal. The signal is carefully amplified and modulated, and fed into a cathode ray tube monitor to display the image. The signal can also be recorded onto magnetic tape for storage in, for example, a recording stage.

The output of the telecine transfer process finds a number of imagery applications. For example, video dailies are replacing the film dailies or rushes and non-linear editing techniques are replacing conventional film editing. The output of the telecine scanning process may be applied to a film recording stage, which produces a negative film that can be optically printed out as a release print. Ordinarily, a colorist operates a telecine transfer device by adjusting the telecine settings, which include gain, gamma, lift, illumination, matching whites, and matching blacks, to allow for the scene to be captured on the video tape correctly. The amount of latitude in setting up the telecine controls can cause clipping of data as well as viewing of a flat image on the monitor. The colorist may then have to color grade each scene, spending more telecine time and consequently adding more expense to the production job. That is, there are several drawbacks of this current practise. First of all, the dp has little control over the look of the dailies. Secondly, there is no "language" of printer lites or describable quantities to inform the dp how the negative was exposed and how much latitude exists for future correction.

More specifically, a major drawback of all these video applications is that the video signal resulting from the telecine transfer process has to be custom processed for each application. That is, an acceptable scene reproduction is obtained from dailies created on a trial-and-error basis, which is generally time-consuming. In case the cinematographer is not pleased with the scene look on the daily, the whole process is then repeated, starting with new adjustments and ending with another telecine transfer, until the desired look is obtained. Besides being time consuming, this is a relatively expensive process. Also, the telecine transfer method typically does not offer a quantitative assessment of the film system exposure information and does not provide, as in prior art systems, repeatable and reproducible values from which a cinematographer/director of photography could order the color correction of the film in a manner understood by a color correction specialist or "timer".

SUMMARY OF THE INVENTION

The present invention advantageously provides a method, apparatus and system for reproducible digital imagery products of film content.

In one embodiment of the present invention a method for the transfer of motion picture film to reproducible digital imagery includes providing full range dynamic scanning of the color components of the original film content and providing a log video signal comprising at least grey scale density information of the scanned film content. The method of the present invention can further include providing density offsets for each of the color components of the film content to color correct the log video signal of the film content. In one embodiment of the present invention, such density offsets are linear offsets and are configured to emulate Printer Light offset values typically between 0 and 50.

In an alternate embodiment of the present invention, a color correction device includes a user interface configured to enable adjustment of density values of a log video representation of film content to digitally color correct the log video representation of the film content, the log video representation of the film content having grey scale density values for the colors of the film content.

In an alternate embodiment of the present invention a telecine device for the transfer of motion picture film to reproducible digital imagery receives film content and provides a log video signal comprising at least grey scale density information for the colors of the received film content, the telecine device providing full range dynamic scanning of the color components of the received film content. The telecine device can further provide a digital data file representation of the film content.

In an alternate embodiment of the present invention, a system for the transfer of motion picture film to reproducible digital imagery includes a telecine device including an input port for receiving original film content and at least one output port for providing a log video signal comprising at least grey scale density information for the colors of the received film content. In one embodiment of the present invention, the telecine device provides full range dynamic scanning of the color components of the received film content. The system of the present invention further includes a color correction device for providing density offsets for each of the color components of the scanned film content if needed. The system of the present invention can further include a video storage device for recording at least the color corrected log video signal.

BRIEF DESCRIPTION OF THE DRAWINGS

The teachings of the present invention can be readily understood by considering the following detailed description in conjunction with the accompanying drawings, in which.

Figure 1:
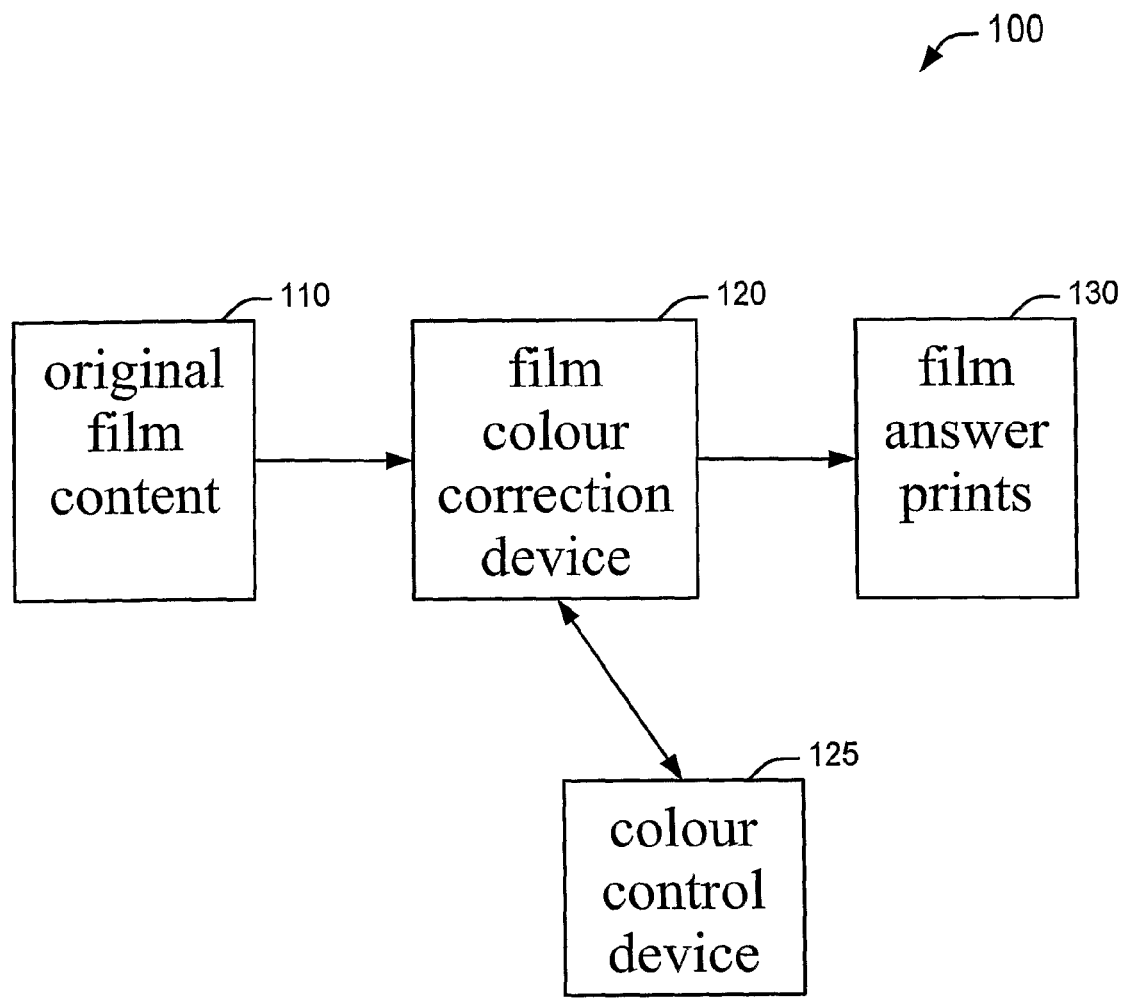
FIG. 1 depicts a high level block diagram of a prior art color correction flow process/system.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for the transfer of motion picture film to reproducible digital imagery products and for the color correction of the reproducible digital imagery products. Although the present invention will be described primarily within the context of a specific telecine color correction system for producing digital dailies, the specific embodiments of the present invention should not be treated as limiting the scope of the invention. It will be appreciated by those skilled in the art and informed by the teachings of the present invention that the concepts of the present invention can be advantageously applied in substantially any system for the transfer of motion picture film to reproducible digital imagery for many other applications such as the color correction of film, the re-timing of digital dailies, determining an initial starting point for a final digital intermediate and the like.

FIG. 1 depicts a high level block diagram of a prior art color correction flow process/system. The prior art color correction flow process/system 100 of FIG. 1 illustratively comprises an original film content block 110, a traditional film color correction device 120, a color control device 125 and a resulting film answer print block 130. In the prior art color correction flow process/system of FIG. 1, original film content 110 is fed into the film color correction device 130. In the film color correction device 130 white light is passed from a scene through dichroic filters/mirrors to split the light into its three components, red, green and blue. The three light components are used to expose a test film strip from which the densities corresponding to the intensities of the red, green and blue components of the light could be measured and compared with standard densities which correspond to an "ideal" exposure. The densities produced by the red, green and blue light components on the test film strip give an indication of the exposure given to the original film as the scene was recorded. The density information provides values typically between 0 and 50, the neutral values typically being 25, 25, 25 and correspond to the median exposure.

Figure 2:
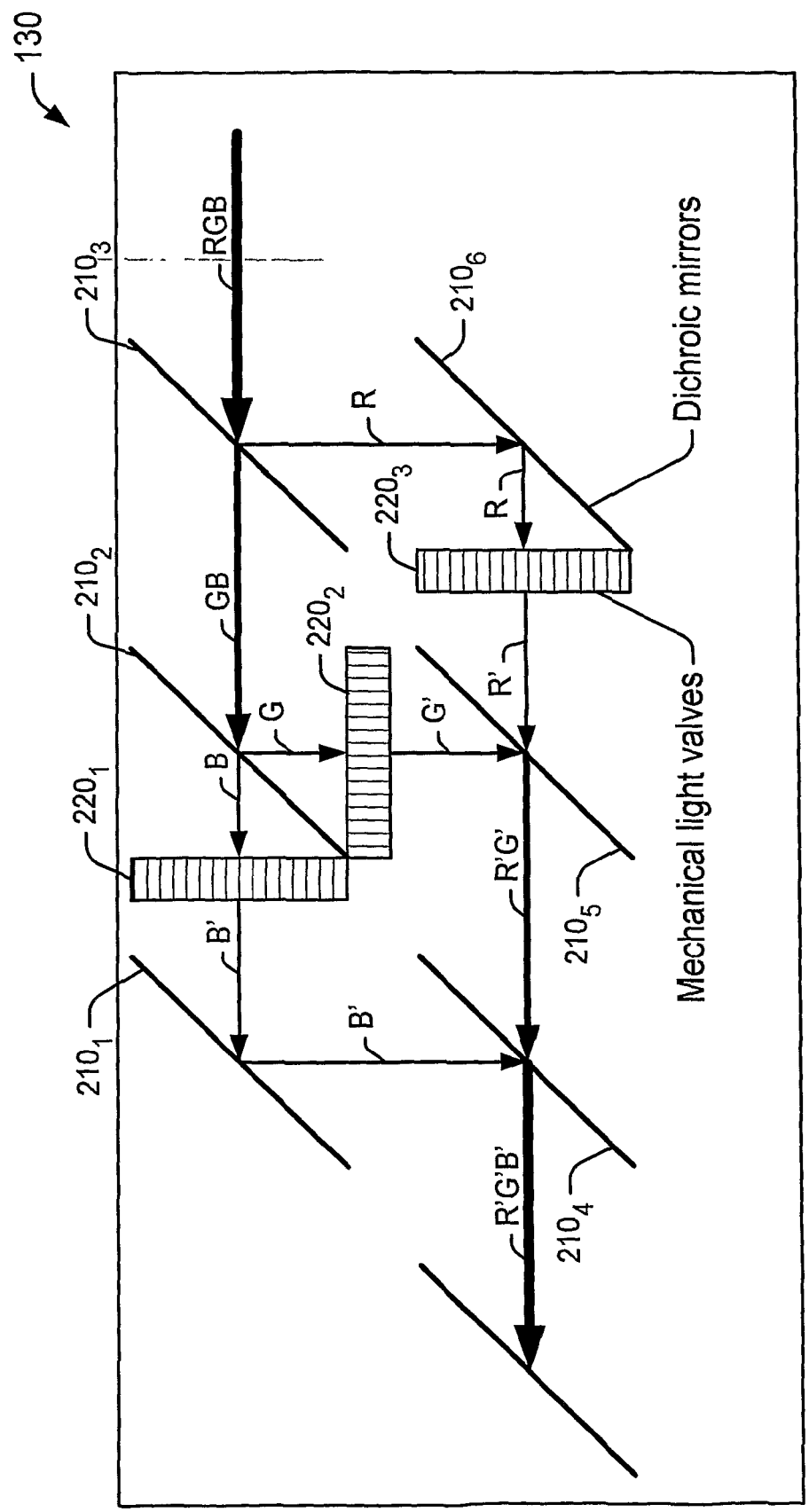
FIG. 2 depicts a high level block diagram of a film color correction device suitable for use in the color correction flow process/system of FIG. 1.

FIG. 2 depicts a high level block diagram of a film color correction device 130 suitable for use in the color correction flow process/system of FIG. 1. The film color correction device 130 of FIG. 2 illustratively comprises six (6) dichroic filters/mirrors $210_1$-$210_6$ and three mechanical light valves $220_1$-$220_3$. The six (6) dichroic filters/mirrors $210_1$-$210_6$ are implemented to split the light into its three components, red, green and blue. The three light components are then used to expose a film strip. The three mechanical light valves $220_1$-$220_3$ are used to respectively adjust the amount/density of red, green and blue light used to expose a film strip to color correct the specific scene of the film strip being illuminated. That is, a colorist (timer) via the color control device 125 adjusts the three mechanical light valves $220_1$-$220_3$ to vary the densities of the respective red, green and blue lights in a very repeatable manner, which can be recalled by a cinematographer/director of photography or the colorist (timer) to reproduce the desired color information for various scenes. The three mechanical light valves $220_1$-$220_3$, controlled by the color control device 125, provide density values typically between 0 and 50, for each of the respective red, green and blue lights such that a desired value can be determined and recalled for each of the respective red, green and blue lights to produce a desired, very repeatable color effect for respective scenes of a film strip.

However and as previously mentioned, there is an increasing demand for motion picture negative film to be transferred directly to video such that the film is never printed as described above in the prior art color correction systems, because most film programs made specifically for television are transferred to video tape prior to showing. Furthermore, with the move toward the digital filming of content made for theatre programming, color correction as described above, also cannot not be performed on such content intended to be viewed in a theatre.

As previously described, in the digital arena telecine machines enable the transfer of film content directly to video. Video dailies resulting from the telecine transfer process are replacing the film dailies or rushes. Ordinarily, a colorist operates a telecine transfer device by adjusting the telecine settings, which include gain, gamma, lift, illumination, matching whites, and matching blacks, to enable the color correction of a scene to be captured on a video tape. As previously described however, a major drawback of all these video applications is that the video signal resulting from the telecine transfer process has to be custom processed for each application. That is, an acceptable scene reproduction is obtained from dailies created on a trial-and-error basis, which is generally time-consuming. In case the cinematographer is not pleased with the scene look on the daily, the whole process is then repeated, starting with new adjustments and ending with another telecine transfer, until the desired look is obtained. Also, the telecine transfer method typically does not offer a quantitative assessment of the film system exposure information and does not provide, as in prior art systems, repeatable and reproducible values from which a cinematographer/director of photography could order the color correction of the film in a manner understood by a color correction specialist or "timer".

To address the deficiencies of the prior art telecine transfer process and to attempt to recapture the reproducible and repeatable results of the optical color correction systems, such as the color correction system 100 of FIG. 1, the inventors provide a method, apparatus and system for the transfer of motion picture film to reproducible digital imagery.

Figure 3:
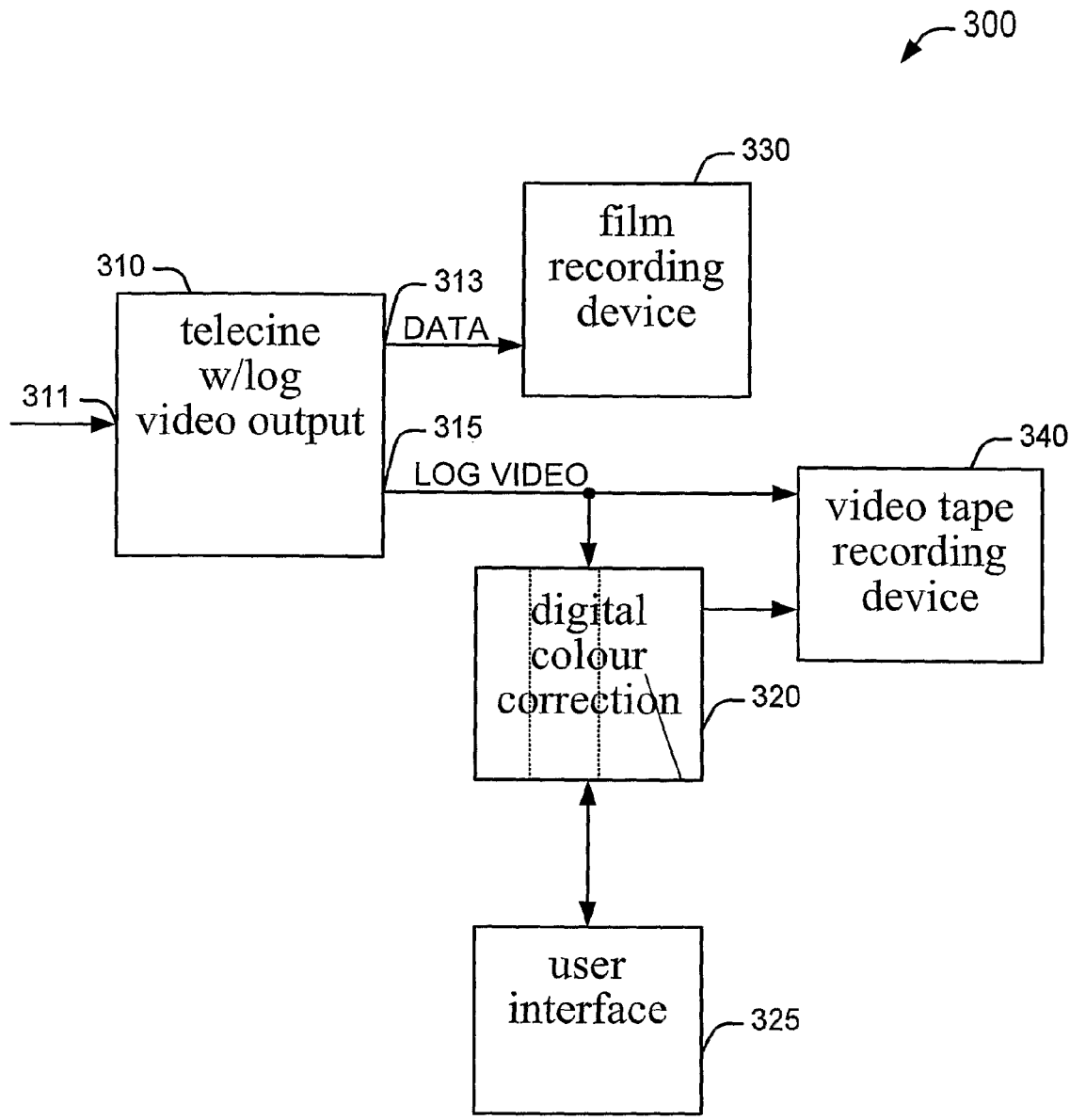
FIG. 3 depicts a high level block diagram of a telecine color system for the transfer of motion picture film to reproducible digital imagery in accordance with an embodiment of the present invention.

FIG. 3 depicts a high level block diagram of a telecine color system for the transfer of motion picture film to reproducible digital imagery in accordance with an embodiment of the present invention. The telecine color system 300 of FIG. 3 illustratively comprises a novel telecine device 310, a digital color correction device 320, a film recording device 330 and a video tape recording device 340. Alternatively, the video tape recording device 340 of the telecine color system 300 can further comprise separate storage sections (not shown) for storing a raw log video signal and a color corrected log video signal (described in further detail below). In an alternate embodiment of the present invention, a color system of the present invention can comprise a separate storage means for individually storing a raw log video signal and a color corrected log video signal. In addition, although in FIG. 3, the system of the present invention is illustratively depicted as a telecine color system 300, in alternate embodiments of the present invention, other devices and means can be implemented to generate a digital imagery representation of the received film content or to provide full dynamic range scanning of received film content in accordance with the present invention.

In the telecine color system 300 of FIG. 3, original film content is fed into the modified telecine device 310. The telecine device 310 provides full dynamic range scanning of the received film content. In addition, in one embodiment of the present invention the scanning of the telecine device 310 provides separate red, green and blue components of the received film content.

Figure 4:
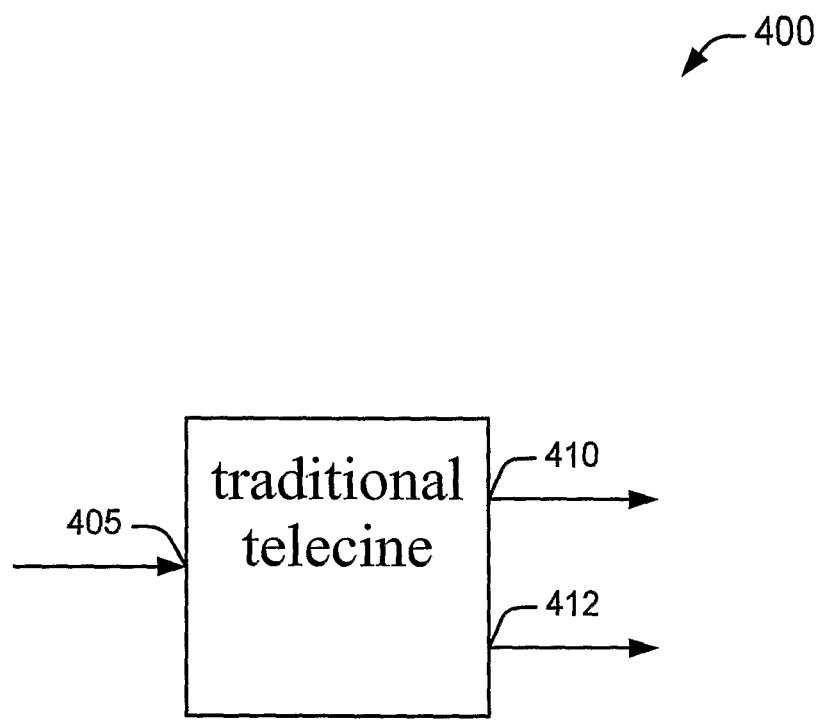
FIG. 4 depicts a high level block diagram of a prior art telecine device.

"FIG. 4 depicts a high level block diagram of a prior art telecine device 400. The telecine device 400 of FIG. 4 comprises an input 405 for receiving film content and two output ports 410 and 412. The prior art telecine device 400 receives original film content and provides scanning. The first output port 410 of the prior art telecine device 400 provides a Log data file (e.g., scene number, shot number, a description of the scene). The second output port 412 of the prior art telecine device 400 provides a traditional video image output."

In contrast to the prior art telecine device 400 of FIG. 4, the novel telecine device 310 of the telecine color system 300 of FIG. 3 of the present invention comprises a Log video output. More specifically, the novel telecine device 310 of the telecine color system 300 of FIG. 3 comprises an input 311 for receiving film content and two outputs 313 and 315. The first output port 313 of the telecine device 310 provides a 10 bit Log data file (e.g., TIF file or DPX file). The second output port 315 of the telecine device 310 of the present invention provides a real-time log video output. More specifically, the first output port 313 of the telecine device 310 of the present invention provides a 10 bit Log data file. The 10 bit Log data file contains information regarding at least the grey scale values of the scanned film content on, for example, a scene by scene basis. The data file of the first output port 313 is communicated to the film recording device 330. The data file output of the first output port 313 is a slow output signal.

In the telecine device 310 of the present invention the second output port 315 is used as a pipeline (transport device) for an intrinsically log video signal. That is, the second output port 315 of the telecine device 310 of the present invention outputs a log video signal representation of the received film content that contains grey scale values of the scanned film content on, for example, a scene by scene basis, like the first output port 313, however, unlike the data from the first output port 313, the log video signal provided by the second output port 315 is a real-time log video signal and not a file like on the first output port 313 data port. The log video signal provided by the second output port 315 is communicated to the digital color correction device 320 and to the video tape recording device 340 for recording. As described above, the video tape recording device 340 can comprise separate storage sections (not shown) for storing a raw log video signal and a color corrected log video signal. The log video signal provided by the second output port 315 comprises a low resolution and low compression signal, which is acceptable for producing digital dailies on the video tape recording device 340. The resulting video images can then be displayed either on a digital projector or monitor (not shown).

More specifically, the digital values in the video pipeline are substantially the same as the digital values in the first output port 313 of the telecine device 310 (data pipeline). As such, not only can the same image processing be applied to the signals from both, the first output port 313 and the second output port 315 of the telecine device 310, but any manipulations applied to the "video" signal during the dailies process as described above, can be automatically applied to the "data" images later in the digital intermediate process with substantially identical results. However, it should be noted that "video" workflow from the second output port 315 runs in real time with minimal resource overhead, whereas the "data file" workflow the first output port 313 nominally runs in less than real time and requires disk space and computer resources. As such, in various embodiments of the present invention, the video pipeline of the present invention is used for dailies, where time is of the essence, and "final film" quality is not a requirement, and the data workflow of the present invention is used for the "film quality" final color correction, where more time and computer resources can be allocated.

In the telecine color system 300 of FIG. 3, the color correction device 320 provides digital color correction for the log video signal provided by the second output port 315 of the telecine device 310. That is, in one embodiment of the present invention, the scanning of the telecine device 310 provides separate red, green and blue components of the received film content. As such, the mapping and density between the separated colors is known from scanning. Using the known densities between the colors, the color correction device 320 provides digital color correction by providing density offsets for each of the separated colors.

In one embodiment of the present invention, the color correction device 320 can comprise a user interface 325 for providing a user with a means for providing density offsets for each of the separated colors to accomplish color correction or adjustments. The user interface 325 of the color correction device 320 can comprise wireless remote controls, pointing devices, such as a mouse or a trackball, voice recognition systems, touch screens, on screen menus, buttons, knobs and the like. In addition, the user interface 325 can be provided directly on the color correction device 320 or on a remote panel or device. As such, digital color correction or adjustments can be made to the individual color components of the digitally scanned original film content via the provided user interface 325. Such offsets can be linear offsets and can be configured to emulate the Printer Light correction of prior art analog color correction devices. For example, in one embodiment of the present invention, the linear density offsets can be configured to provide values typically between 0 and 50 to emulate the prior art analog Printer Light offset values. As such, and because the log video output of the novel telecine device of the present invention comprises at least grey scale values and information of the original film content on, for example a scene by scene basis, the telecine color system of the present invention is able to provide reproducible digital imagery products (e.g., dailies) which offer a quantitative assessment of the film content exposure information and provide, as in prior art systems, repeatable and reproducible values from which a cinematographer/director of photography could order the color correction of the film content in a manner understood by a color correction specialist or "timer". Furthermore, because in several embodiments of the present invention, the color corrected log video signal (e.g., digital dailies) are recorded on tape, the recorded video can be replayed again for further color correction or adjustment and such a process eliminates the need for the original film content to be rescanned or processed again to adjust a previously determined color correction or to determine an entirely new color correction.

In an alternate embodiment of the present invention, if digital dailies are wanted as data files instead of on tape as described above, then data files provided by the first output port 313 of the telecine device 310 of the present invention can be used to provide the digital dailies as files, however the process would take longer. In such embodiments of the present invention, the data files from the first output port 313 of the telecine device 310 would be first communicated to the color correction device 320 for color correction as described above.

In addition to providing log video signals for the purposes of creating digital dailies recorded by the video tape recording device 340, the telecine color system 300 of the present invention can be used to determine an initial starting point for a final digital intermediate. That is, for the concepts of the present invention to be used directly for color correction, the "full range" calibration which was used during the dailies process must match the "full range" calibration used for scanning the negative for the digital intermediate. That is, in one embodiment of the present invention a telecine device used during dailies is calibrated such that the resulting digital values in an HD output stream are substantially identical to the bit code values which are produced when the same piece of film negative is scanned into 10 bit log dpx files for the digital intermediate process. The physical dailies are not used as source material for the digital intermediate because the physical dailies media has the look of the dailies already preserved (e.g., "baked in"). The original uncorrupted source acquisition material must be used (i.e., the original camera negative which was scanned at full dynamic range) as the starting point for the digital intermediate.

More specifically, the telecine color system 300 of the present invention can be used to color correct an entire original film content for release prints. Unlike in previous digital telecine devices used for color correction where a video signal resulting from the telecine transfer process has to be custom processed for each application, the information used in the color correction of a telecine color system of the present invention, specifically the grey scale values in the log video signal of the present invention used to create the digital dailies, can be used as a starting point or a reference point for a final color correction or adjustment of the entire original film content. That is, in accordance with the present invention, if the full range video signal is captured on, for example, a video tape (i.e., a separate recording section of the video tape recording device 340) during the dailies process as described above, (before any initial color correction had been applied), then additional "creative" color corrections could be applied to this "raw full-range" capture without having to re-telecine the film. This provides the creative types (e.g., the director and/or cinematographer) with additional opportunities during post-production stages to re-visit and modify the "look" of each shot, no longer being locked in and limited by the initial look imposed during the dailies process.

Even further, there are many low-budget productions and independent films which, for financial reasons, perform final color correction via a "video" workflow. If in accordance with the present invention, the film negative is telecined in "full range log" video as described above, then the entire latitude of the negative would be available for further creative modification during the color correction process.

The concepts of the present invention further includes printer lite emulation. That is, during a "digital intermediate" color correction session, a full range scan of the negative is color corrected, and the resulting image is displayed either on a digital projector or monitor. The top digital intermediary facilities have the ability (as result of lots of color science and really good sets of eyes) to display this image so that it substantially matches a final film print. As such, if the allowable color corrections are restricted to be the same manipulations that occur at a color lab through printer lites, a successful emulation is accomplished. A big problem of prior art printer lite emulation was that the full range scanning of a film negative was time consuming, and beyond the capability of telecine hardware. However, recent advances in technology allow for a full range logarithmic signal to be achieved—but this requires extremely critical calibration of the scanning/telecine system. As such, the combination of carefully calibrated full range telecine hardware, color correction algorithms that reproduce "printer lite" manipulations, and an accurate "film print colorimetry" emulation for HD monitor displays, results in an "hd dailies" system that can accurately reproduce the precise results obtainable through traditionally lab printer light film dailies in accordance with the present invention. With the principles of the present invention, once again, a director of photography (dp) is able to call lites, receive meaningful information as to the exposure on the negative, and insure that the dailies are a product of his creative decisions.

In various embodiments of the present invention the printer lite emulation of the present invention is calibrated to a specific lab, so calling a particular set of lites matches calling the same lites at a specific lab. However, there is nothing to prevent a system in accordance with the present invention to be calibrated with any other specific laboratory's printer lites.

Having described various embodiments for a method, apparatus and system for the creation of reproducible digital imagery products from film content and for the color correction of the reproducible digital imagery products (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for providing a reproducible digital imagery product from film content, comprising:
    scanning said film content;
    determining grey scale density values for colors of said film content;
    determining offset values for said grey scale density values to color correct said digital imagery representation of said film content;
    generating a 10 bit log video signal representation of said film content-comprising a low resolution and low compression signal that encodes the grey scale density values and offset values, which is acceptable for producing dailies;
    manipulating said grey scale density values of said log video signal representation of said film content; and
    applying said manipulations to a corresponding digital data file representation of said film content for producing a color corrected film quality digital data file.

2. The method of claim 1, wherein said log video signal representation of said film content is color corrected for a specific display environment.

3. The method of claim 1, wherein said log video signal representation contains grey scale values of said film content on a scene by scene basis.

4. The method of claim 1, wherein said log video signal representation of said film content is used to produce dailies.

5. The method of claim 1, wherein said scanning provides separate color components of said film content and respective information regarding mapping and density values for said colors components of said film content.

6. The method of claim 5, further comprising providing respective density offsets for said color components of said film content for color correcting said log video signal representation of said film content.

7. The method of claim 6, wherein said density offsets comprise linear offsets.

8. The method of claim 6, wherein said density offsets are configured to provide values between 0 and 50 to emulate analog printer light offset values.

9. The method of claim 1, further comprising storing said log video signal representation.

10. The method of claim 9, wherein said log video signal representation is stored on a scene by scene basis.

11. The method of claim 9, wherein said stored log video signal is used as a starting point for a digital intermediate.

12. A color correction device for film content, comprising:
    an interface configured to enable an adjustment of grey scale density values of a 10 bit log video signal representation of said film content to color correct said log video signal representation, said log video signal representation of said film content comprising grey scale density values for the colors of said film content and offset values for said grey scale density values to color correct said film content, wherein said 10 bit log video signal representation comprises a low resolution and low compression signal, which is acceptable for producing dailies, and further configured to apply manipulations of said grey scale density values of said log video signal representation of said film content and to a corresponding digital data file representation of said film content for producing a color corrected film quality digital data file.

13. The color correction device of claim 12, wherein said user interface comprises at least one of a wireless remote control, a pointing device, such as a mouse or a trackball, a voice recognition system, a touch screen, on screen menus, buttons, and knobs.

14. A system for providing a reproducible digital imagery product from film content and color correction thereof, comprising:
    a scanning device for generating a 10 bit log video signal representation of said film content; and
    a color correction device for adjusting density values of said 10 bit log video signal representation of said film content to color correct said 10 bit log video signal representation, said 10 bit log video signal representation comprising grey scale density values for the colors of said film content, and for applying said adjustments to a corresponding digital data file representation of said film content for producing a color corrected film quality digital data file,
    wherein said 10 bit log video signal representation comprises a low resolution and low compression signal, which is acceptable for producing dailies.

15. The system of claim 14, further comprising storage for storing a color corrected log video signal representation.

16. The system of claim 14, further comprising storage for storing said log video signal representation from said scanning device before said color correction.

17. The system of claim 14, wherein said scanning device further generates a digital data file representation of said film content.

18. The system of claim 17, further comprising storage for storing said digital data file.

19. The system of claim 14, wherein said scanning device comprises a telecine.

20. The system of claim 14, wherein said scanning device provides full dynamic range scanning of said film content.

* * * * *